US011631983B2

United States Patent
Williams et al.

(10) Patent No.: US 11,631,983 B2
(45) Date of Patent: Apr. 18, 2023

(54) REUSABLE SHIPPING CONTAINER WITH CHARGING INTERFACE

(71) Applicant: RAI STRATEGIC HOLDINGS, INC., Winston-Salem, NC (US)

(72) Inventors: Aaron P. Williams, Winston-Salem, NC (US); Leigh Ann B. Joyce, Lewisville, NC (US); James N. Figlar, Clemmons, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 328 days.

(21) Appl. No.: 16/806,345

(22) Filed: Mar. 2, 2020

(65) Prior Publication Data

US 2021/0273467 A1    Sep. 2, 2021

(51) Int. Cl.
| | |
|---|---|
| *H02J 7/00* | (2006.01) |
| *H02J 50/12* | (2016.01) |
| *H02J 50/40* | (2016.01) |
| *B65D 90/00* | (2006.01) |
| *G08B 7/06* | (2006.01) |
| *A24F 40/95* | (2020.01) |
| *B65D 88/12* | (2006.01) |
| *H02J 50/00* | (2016.01) |

(52) U.S. Cl.
CPC ............ *H02J 7/0045* (2013.01); *A24F 40/95* (2020.01); *B65D 88/12* (2013.01); *B65D 90/0073* (2013.01); *G08B 7/06* (2013.01); *H02J 7/0013* (2013.01); *H02J 7/00032* (2020.01); *H02J 7/0047* (2013.01); *H02J 50/005* (2020.01); *H02J 50/12* (2016.02); *H02J 50/40* (2016.02)

(58) Field of Classification Search
CPC ...................................................... H02J 7/0045
USPC ......................................................... 320/108
See application file for complete search history.

(56) References Cited

U.S. PATENT DOCUMENTS

| | | | |
|---|---|---|---|
| 5,154,192 | A | 10/1992 | Sprinkel et al. |
| 5,568,037 | A | 10/1996 | Massaroni et al. |
| 7,726,320 | B2 | 6/2010 | Robinson et al. |
| 8,499,766 | B1 | 8/2013 | Newton |
| 8,539,959 | B1 | 9/2013 | Scatterday |
| 9,936,733 | B2 | 4/2018 | Ampolini et al. |
| 10,206,431 | B2 | 2/2019 | Sur et al. |
| 10,231,485 | B2 | 3/2019 | Sur |
| 10,258,086 | B2 | 4/2019 | Sur |

(Continued)

*Primary Examiner* — Yalkew Fantu
(74) *Attorney, Agent, or Firm* — Womble Bond Dickinson (US) LLP (57) ABSTRACT

The present invention is directed to a shipping container configured to charge a plurality of power supplies associated with a plurality of aerosol delivery devices. The shipping container comprises at least one tray comprising at least one first charging interface configured to provide energy to the plurality of power supplies to charge the power supplies. In some embodiments, the at least one first charging interface is configured to wirelessly charge the plurality of power supplies. In other embodiments, the at least one first charging interface is configured to charge the plurality of power supplies via one or more physical connections. In some embodiments, the at least one first charging interface is configured to electrically couple to at least one local power storage unit. In some embodiments, the at least one first charging interface is configured to electrically couple to at least one external power source.

17 Claims, 4 Drawing Sheets

(56) References Cited

U.S. PATENT DOCUMENTS

| | | |
|---|---|---|
| 10,333,339 B2 | 6/2019 | Sur |
| 10,470,495 B2 | 11/2019 | Sur et al. |
| 10,505,383 B2 | 12/2019 | Sur |
| 10,517,326 B2 | 12/2019 | Sur et al. |
| 10,524,508 B2 | 1/2020 | Sur et al. |
| 10,537,137 B2 | 1/2020 | Sur et al. |
| 2010/0028766 A1 | 2/2010 | Peckerar et al. |
| 2013/0063073 A1* | 3/2013 | Kawasaki ............. H02J 7/0013 307/66 |
| 2013/0255702 A1 | 10/2013 | Griffith, Jr. et al. |
| 2014/0096781 A1 | 4/2014 | Sears et al. |
| 2014/0261495 A1 | 9/2014 | Novak et al. |
| 2015/0020825 A1 | 1/2015 | Galloway et al. |
| 2015/0216232 A1 | 8/2015 | Bless et al. |
| 2015/0216233 A1 | 8/2015 | Sears et al. |
| 2015/0224268 A1 | 8/2015 | Henry et al. |
| 2016/0205800 A1* | 7/2016 | Roberts ................. A45C 13/02 361/809 |
| 2017/0112191 A1 | 4/2017 | Sur et al. |
| 2017/0112194 A1 | 4/2017 | Sur et al. |
| 2017/0112196 A1* | 4/2017 | Sur ........................ H02J 50/10 |
| 2017/0290371 A1 | 10/2017 | Davis et al. |
| 2017/0310133 A1 | 10/2017 | Bickley |
| 2018/0070633 A1 | 3/2018 | Phillips et al. |
| 2018/0140011 A1 | 5/2018 | Sur et al. |
| 2019/0255266 A1 | 8/2019 | Henry, Jr. et al. |
| 2019/0363557 A1* | 11/2019 | Maguire ................ G06Q 20/18 |
| 2020/0046021 A1 | 2/2020 | Sur |

\* cited by examiner

REUSABLE SHIPPING CONTAINER WITH CHARGING INTERFACE

BACKGROUND

Field of the Disclosure

The present disclosure relates to shipping containers. More particularly, the present disclosure relates to shipping containers for rechargeable power supplies that are configured to one or more of charge, maintain a charge, regulate a charge, or monitor power supplies contained therein. In some embodiments, the power supplies may be associated with aerosol delivery devices.

Description of Related Art

Many devices utilize rechargeable power supplies. These power supplies can be manufactured and tested before being shipped. After manufacture, a power supply is typically charged to verify the power supply meets one or more quality verifications and/or to otherwise meet expectations of consumers and end users. For example, a power supply may be charged to verify the power supply is capable of receiving a charge, maintaining a charge, discharging in a controlled manner, or other property to verify the power supply was manufactured properly.

Once manufactured, power supplies may be shipped before being packaged for final sale. In some instances, such power supplies can discharge over time such that extended shipping, warehousing, or shelf time may result in a less than a fully charged power supply being delivered to an end user.

In some instances, power supplies can be air shipped. Current or future regulations may limit an amount of charge of certain power supplies during air shipping. For example, lithium ion power supplies may be required to be below 30 percent of full charge during air shipping.

BRIEF SUMMARY

This disclosure relates generally to shipping containers that are configured to secure, verify, charge, discharge, and/or maintain a charge of a power supply before, during, or after shipping. The present disclosure includes, without limitation, the following example embodiments:

A shipping container configured to charge a plurality of power supplies associated with a plurality of aerosol delivery devices, the container comprising at least one tray, the tray comprising at least one first charging interface, the first charging interface configured to provide energy to the plurality of power supplies to charge the power supplies.

The shipping container of any preceding example embodiment, or any combination of any preceding example embodiments, wherein the tray comprises a plurality of first charging interfaces, the plurality of first charging interfaces configured to provide energy to respective ones of the plurality of power supplies.

The shipping container of any preceding example embodiment, or any combination of any preceding example embodiments, wherein the at least one tray includes a plurality of compartments, the plurality of compartments configured to receive respective ones of the plurality of power supplies.

The shipping container of any preceding example embodiment, or any combination of any preceding example embodiments, wherein respective ones of the plurality of first charging interfaces are associated with respective ones of the plurality of compartments.

The shipping container of any preceding example embodiment, or any combination of any preceding example embodiments, wherein the at least one first charging interface is configured to wirelessly charge the plurality of power supplies.

The shipping container of any preceding example embodiment, or any combination of any preceding example embodiments, wherein the at least one first charging interface is configured to charge the plurality of power supplies via one or more physical connections.

The shipping container of any preceding example embodiment, or any combination of any preceding example embodiments, further comprising at least one local power storage unit, wherein the at least one first charging interface is configured to electrically couple to the at least one local power storage unit.

The shipping container of any preceding example embodiment, or any combination of any preceding example embodiments, further comprising at least one second charging interface, wherein the at least one second charging interface is configured to electrically couple to at least one external power source.

The shipping container of any preceding example embodiment, or any combination of any preceding example embodiments, wherein the at least one second charging interface is configured to electrically couple to the at least one external power supply source via at least one physical connection.

The shipping container of any preceding example embodiment, or any combination of any preceding example embodiments, wherein the at least one second charging interface is configured to electrically couple to the at least one external power source via a wireless connection.

The shipping container of any preceding example embodiment, or any combination of any preceding example embodiments, wherein the wireless connection comprises a receiver coil located on the container that is configured to wirelessly connect to a transmission coil of the at least one external power source.

The shipping container of any preceding example embodiment, or any combination of any preceding example embodiments, further comprising at least one indicator configured to provide a status indication for one or more of the plurality of power supplies.

The shipping container of any preceding example embodiment, or any combination of any preceding example embodiments, wherein the at least one indictor comprises one or more of an indicator light, a plurality of indicator lights, an audible indicator, a plurality of audible indicators, a digital display, or any combination thereof.

The shipping container of any preceding example embodiment, or any combination of any preceding example embodiments, further comprising a container controller configured to control power delivery to the plurality of power supplies.

The shipping container of any preceding example embodiment, or any combination of any preceding example embodiments, wherein the at least one tray includes a charging controller in communication with the container controller.

The shipping container of any preceding example embodiment, or any combination of any preceding example embodiments, wherein the shipping container is configured to be shipped with the plurality of power supplies electrically interfaced with the at least one first charging interface.

The shipping container of any preceding example embodiment, or any combination of any preceding example embodiments, wherein the at least one tray includes a liner configured to reduce shock and/or vibration delivered to the plurality of power supplies during shipping.

The shipping container of any preceding example embodiment, or any combination of any preceding example embodiments, wherein the at least one tray includes a liner that is coated and/or formed from a fire retardant material.

The shipping container of any preceding example embodiment, or any combination of any preceding example embodiments, wherein the container further comprises at least one tray receiver, wherein the at least one tray further comprises at least one tray connector, and wherein the at least one tray receiver of the container is configured to receive the at least one tray connector of the at least one tray.

The shipping container of any preceding example embodiment, or combination of any preceding example embodiments, wherein the at least one tray receiver of the container and the at least one tray connector of the at least one tray are configured to create an electrical connection.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise

BRIEF DESCRIPTION OF THE FIGURES

Having thus described aspects of the disclosure in the foregoing general terms, reference will now be made to the accompanying drawings, which are not necessarily drawn to scale, and wherein:

DETAILED DESCRIPTION

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

Some aerosol delivery devices use electrical energy to heat a material to form an inhalable substance, e.g., electrically heated tobacco products. The material may be heated without combusting the material to any significant degree. Components of such systems have the form of articles that are sufficiently compact to be considered hand-held devices. That is, use of components of aerosol delivery devices does not result in the production of smoke in the sense that aerosol results principally from by-products of combustion or pyrolysis of tobacco, but rather, use of those systems results in the production of vapors resulting from volatilization or vaporization of certain components incorporated therein. In some example embodiments, components of aerosol delivery devices may be characterized as electronic cigarettes, and those electronic cigarettes may incorporate tobacco and/or components derived from tobacco, and hence deliver tobacco-derived components in aerosol form.

In various embodiments, an aerosol delivery device may comprise a power supply (e.g., an electrical power source), a control component, a heating source or other atomizer, and an aerosol-generating source (e.g., an aerosol source member that includes a substrate portion that includes an aerosol precursor composition, or a liquid composition that includes an aerosol precursor composition) capable of yielding an aerosol upon application of sufficient energy. In some embodiments, the aerosol delivery device may comprise a tobacco heating product, also referred to as a heat-not-burn-product, that heats a substrate that may comprise tobacco or extract therefrom to generate an aerosol. Example tobacco heating products include devices that have been marketed as ACCORD® by Philip Morris Incorporated; ALPHA™, JOVE 510™ and M4™ by InnoVapor LLC; CIRRUS™ and FLING™ by White Cloud Cigarettes; BLU™ by Fontem Ventures B.V.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™ PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd; IQOS™ by Philip Morris International; and GLO™ by British American Tobacco. As noted, some tobacco heating products may include a heating source, such as a resistive heating element and/or an inductive heating element, configured to heat a substrate so as to volatilize an aerosol former and/or an active ingredient contained thereon. In further embodiments, aerosol delivery devices in accordance with the present disclosure may include vapor devices including one or more other atomizers. In some embodiments, the atomizer may be a mechanical atomizer (e.g., a piezo mesh atomizer, surface acoustic wave atomizer, etc.). In some embodiments, the atomizer may include a heating source, which may be a resistive or inductive heating source. In certain embodiments, the atomizer may include a mechanical atomizer for use in concert with a heating source for yielding an aerosol from the aerosol source member. Note that it is possible to physically combine one or more of the above-noted components. For instance, in certain embodiments, a conductive heater trace can be printed on the surface of a substrate material using a conductive ink such that the heater trace can be powered by the power source and used as the resistance heating element.

In various embodiments, a number of these components may be provided within an outer body or shell, which, in some embodiments, may be referred to as a housing. The overall design of the outer body or shell may vary, and the format or configuration of the outer body that may define the overall size and shape of the aerosol delivery device may vary. Although other configurations are possible, in some embodiments, an elongated body resembling the shape of a cigarette or cigar may be a formed from a single, unitary housing or the elongated housing can be formed of two or more separable bodies. For example, an aerosol delivery device may comprise an elongated shell or body that may be substantially tubular in shape and, as such, resemble the shape of a conventional cigarette or cigar. In some embodiments, all of the components of the aerosol delivery device are contained within one housing or body. In other embodiments, an aerosol delivery device may comprise two or more housings that are joined and are separable. For example, an aerosol delivery device may possess at one end a control body comprising a housing containing one or more reusable components, e.g., an accumulator such as a rechargeable battery and/or rechargeable super capacitor and various electronics for controlling the operation of that article) and at the other end and removably coupleable thereto, an outer body or shell containing a disposable portion, e.g., a disposable flavor-containing aerosol source member.

An aerosol delivery device of various embodiments may incorporate a power supply such as a battery or other electrical power source to provide current flow sufficient to provide various functionalities to the aerosol delivery device, such as powering of the heating source or atomizer, powering of control systems, powering of indicators, and the like. The power supply may be able to deliver sufficient power to rapidly activate the heating source or atomizer to provide for aerosol formation and power the aerosol delivery device through use for a desired duration of time. In some embodiments, the power supply is sized to fit conveniently within the aerosol delivery device so that the aerosol delivery device can be easily handled. Examples of useful power supplies include lithium-ion batteries that may be rechargeable, e.g., a rechargeable lithium-manganese dioxide battery. In particular, lithium polymer batteries can be used as such batteries can provide increased safety. Other types of batteries, e.g., N50-AAA CADNICA nickel-cadmium cells, may also be used. Additionally, a power supply may be sufficiently lightweight to not detract from a desirable smoking experience. Some examples of possible power supplies are described in U.S. Pat. No. 9,484,155 to Peckerar et al. and U.S. Patent Application Publication No. 2017/0112191 to Sur et al., filed Oct. 21, 2015, the disclosures of which are incorporated herein by reference in their respective entireties.

Figure 1:
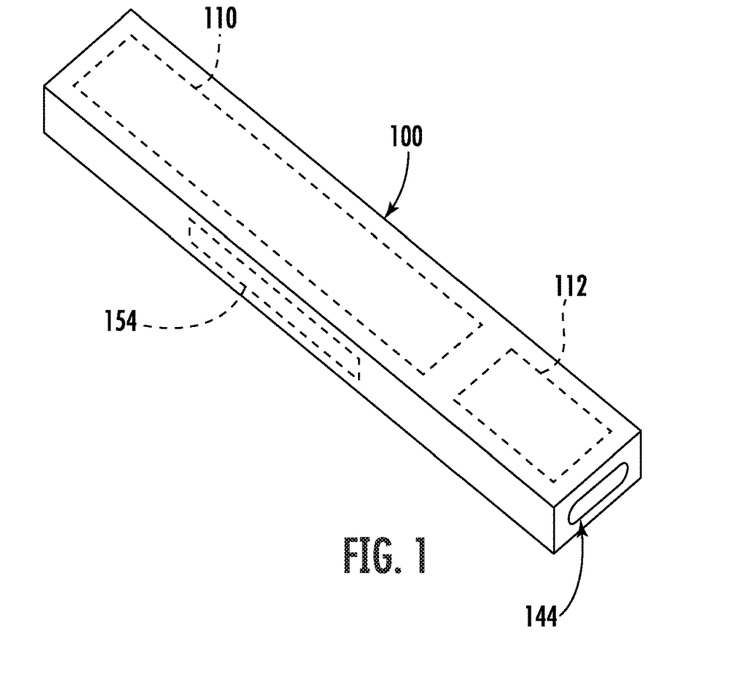
FIG. 1 is a perspective view of a power supply provided in accordance with some embodiments of the present disclosure.

Referring to FIG. 1, in some embodiments a reusable power supply 100 may include a solid-state battery, a thin-film solid-state battery, a rechargeable super capacitor, or the like and may be combined with any type of recharging technology, including connection to a wall charger, connection to a car charger, connection to a computer, a solar array of solar cells, a wireless charger, or other suitable charging connection. For example, the reusable power supply 100 may include a connector 144 that is configured to connect through a cable connection such as a universal serial bus (USB) cable or connector, e.g., USB 2.0, 3.0, 3.1, or USB Type-C connection. In some embodiments, the connector 144 may be a threaded charging port or a plug-in interface. For example, in some embodiments the connector 144 may be a female connector (or a male connector) that is configured to connect to the other of a male connector (or a female connector). As will be described below, other types of physical connectors are also possible. Additionally, or alternatively, the reusable power supply 100 may be configured to use an inductive wireless charging system such as a Qi wireless charging standard from the Wireless Power Consortium (WPC) or a wireless radio frequency (RF) based charger. An example of an inductive wireless charging system is described in U.S. Patent Application Publication No. 2017/0112196 to Sur et al., which is incorporated herein by reference in its entirety. As used herein, "wireless charging" may refer to any form of wireless transfer of energy including, but not limited to, radio charging, inductive charging, or resonance charging.

In some embodiments, the reusable power supply 100 may comprise a battery 110 and/or a capacitor 112. In some embodiments, the capacitors may be capable of discharging more quickly than the battery and can be charged between puffs, allowing the battery 110 to discharge into the capacitor 112 at a lower rate than if it were used to power the heating source directly. For example, a super capacitor, e.g., an electric double-layer capacitor (EDLC), may be used separate from or in combination with a battery 110. When used alone, the super capacitor may be recharged before each use of the article. Thus, a device may also include a charger component that can be attached to the smoking article between uses to replenish the capacitor 112.

Figure 2:
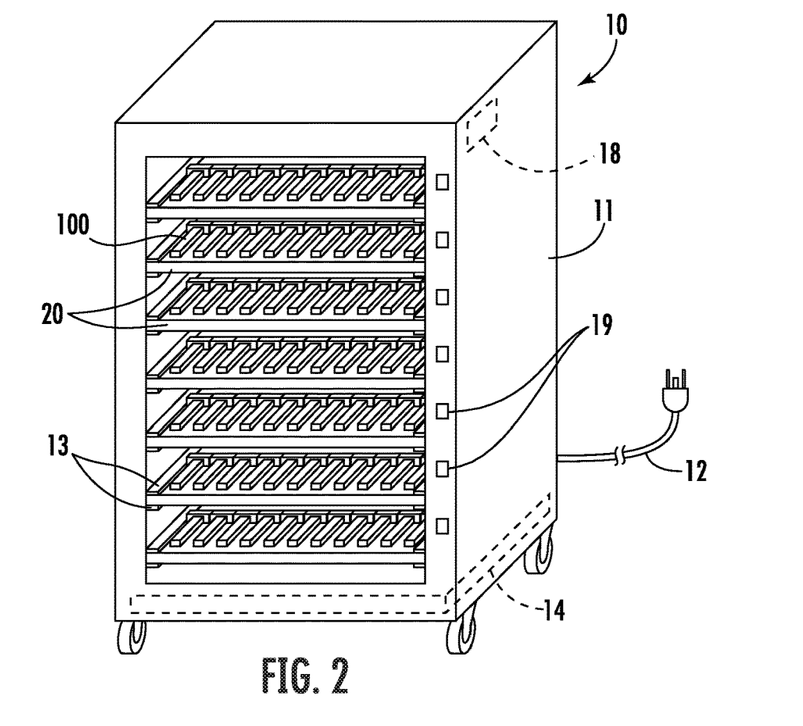
FIG. 2 is a perspective view of a container and trays provided in accordance with some embodiments of the present disclosure including one or more of the power supplies of FIG. 1.
Figure 3:
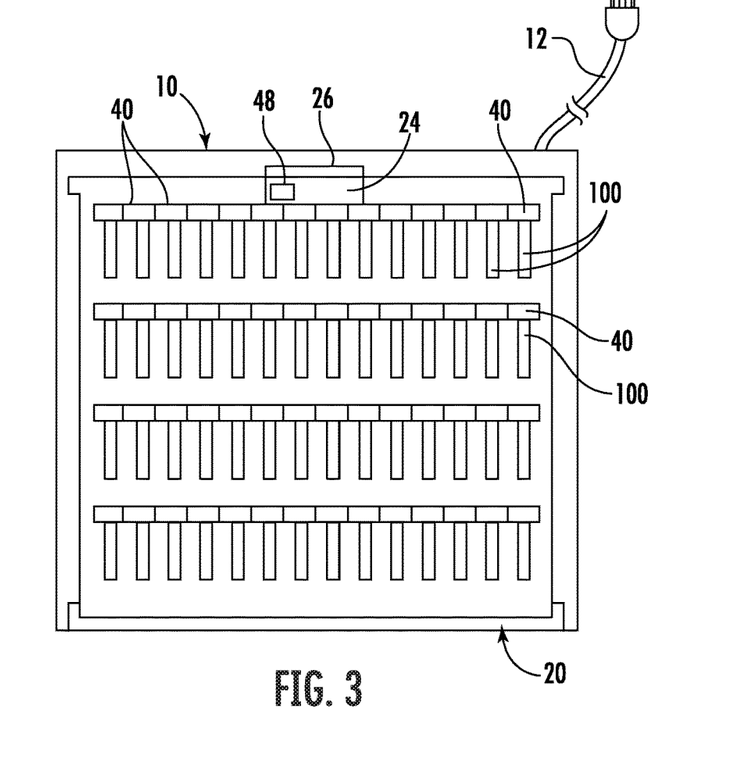
FIG. 3 is a top, cutaway view of the container of FIG. 2.
Figure 4:
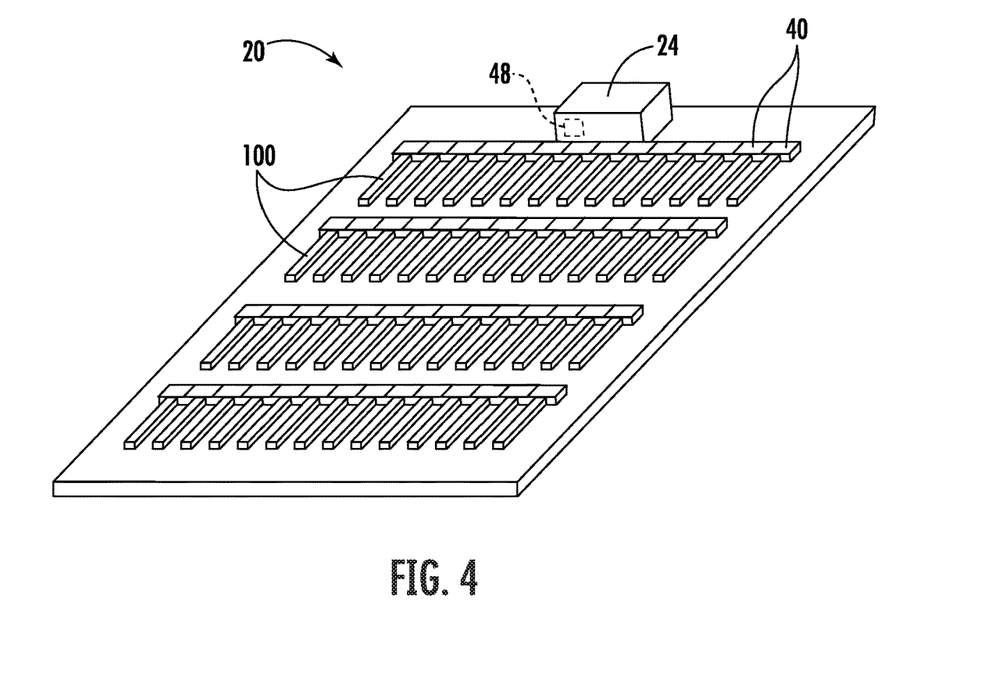
FIG. 4 is a perspective view of a tray of FIG. 2.

In various embodiments, the present invention provides a shipping container comprising at least one charging interface configured to provide energy to a plurality of power supplies. With reference to FIGS. 2-4, a reusable shipping container 10 with a charging interface is provided in accordance with various example embodiments the present disclosure. In the depicted embodiment, the container 10 includes a body 11 that is configured to hold (and in some embodiments secure) a plurality of power supplies 100 therewithin during shipment and to charge or monitor each of the power supplies 100 before, after, or during shipment.

In various embodiments, the container 10 may be sized and dimensioned to fit on a standard shipping pallet and/or may be configured for lifting by a forklift. In some embodiments, the shipping container 10 may include bolsters to enable lifting by a forklift.

In some embodiments, the shipping container may include a single tray having one or more charging interfaces configured to provide energy to the plurality of power supplies. For example, in some embodiments a single charging interface may be configured to provide energy to a plurality of power supplies. In other embodiments, a plurality of charging interfaces may be configured to provide energy to a plurality of power supplies. In still other embodiments, a combination of a single charging interface configured to provide energy to a plurality of power supplies, and a plurality of charging interfaces configured to provide power to a plurality of power supplies may be used. In the depicted embodiment, the shipping container 10 includes a plurality of trays 20 with each tray 20 having a plurality of charging interfaces 40 that are each configured to connect to a respective one of the power supplies 100. As shown, the trays 20 are horizontally orientated shelf-like trays; however, in some embodiments, one or more trays 20 may be vertically orientated rack-like trays. In some embodiments, a container may include a combination of horizontal shelf-like trays and vertical rack-like trays.

Figure 5:
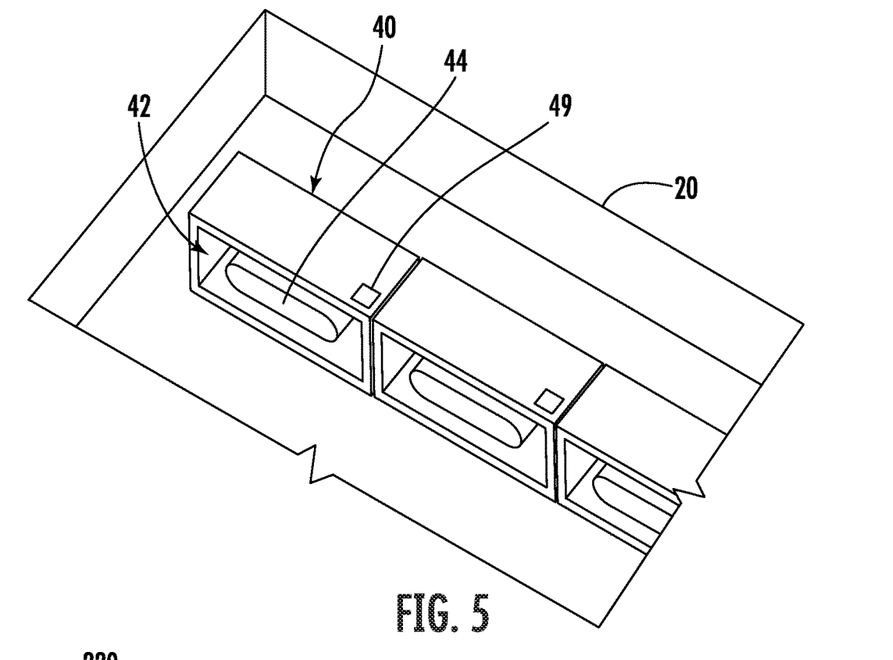
FIG. 5 is an enlarged view of a portion of the tray of FIG. 4.

As noted, in various embodiments the container may include a single charging interface or a plurality (e.g., two or more) of charging interfaces. In some embodiments, the charging interface may be configured to electrically connect to the power supplies via a physical connection (e.g., one or more physical connectors). For example, in some embodiments the charging interface may comprise a male (or female) connector (e.g., a USB connector) and the connector of the power supply may be the other of a female (or male) connector. In other embodiments, the connection between the charging interface and the power supplies may comprise a threaded connection. In other embodiments, other connections are possible, including for example, bayonet-type connections, pin connections, plug and socket connections, jack connections, magnetic connections, etc. In still other embodiments, the charging interface may be configured to electrically connect to the power supplies via a wireless connection, (e.g., one or more charging surfaces, such as, but not limited to, inductive charging surfaces, such as may use the Qi standard). Combinations of charging interfaces are also contemplated. In one example and with additional reference to FIG. 5, a charging interface 40 may be a receptacle 42 that is configured to receive a power supply 100 such that a connector 144 (FIG. 1) of the power supply 100 is aligned with a connector 44 within the receptacle 42. As the power supply 100 is inserted into the receptacle 42, the connector 144 may receive the connector 44 (or vice versa) such that a connection is made therebetween. In various embodiments, the receptacles 42 may be orientated horizontally or along a surface of the tray 20 or may be orientated vertically or substantially perpendicular to a surface of the tray 20. In some embodiments, at least some charging interfaces 40 include both a horizontal receptacle 42 and a vertical receptacle 42. In certain embodiments, at least some charging interfaces 40 may include two horizontal receptacles 42. In particular embodiments, at least some charging interfaces 40 include two horizontal receptacles 42 and a vertical receptacle 42. It will be appreciated that in some embodiments, various charging interfaces 40 may include various combinations of the aforementioned arrangements of horizontal and vertical receptacles 42.

In some embodiments, the charging interfaces 40 may be integrated onto or into trays 20 of the container 10. Each tray 20 may include one or more charging interfaces 40 and may be sized and arrange to maximize a number of power supplies 100 that can be received on each tray 20. For example, each tray 20 may include 1, 10, 20, or 100 charging interfaces 40 and may include a range of 1 to 1000 charging interfaces 40 depending on a size of the tray 20 and a size of the power supplies 100. In some embodiments, one or more trays 20 may include more than 1000 charging interfaces 40. In certain embodiments, one or more trays 20 may include one or more charging interfaces 40 that receive multiple power supplies 100. For example, a single charging interface 40 may receive between 2 and 1000 power supplies 100.

In some embodiments, the trays 20 may be removable from the container 10 to allow for loading and unloading of the power supplies 100 from the respective tray 20. In particular embodiments, one or more trays 20 may be permanently or semi-permanently installed within the container. In some embodiments, the trays 20 may slide relative to the container 10 to provide access to the charging interfaces 40 of the tray 20 in a manner similar to a drawer. In some embodiments, the one or more trays 20 that slide in a drawer-like manner may be removable (e.g., semi-permanently) from the container 10 or may be non-removable (e.g., semi-permanently) from the container 10. In some embodiments, a tray 20 may include one or more tray connector(s) 24 and the container 10 may include a plurality of tray receivers 26 configured to receive a respective one of the tray connectors 24 to form a connection therebetween. The tray receivers 26 may be positioned such that as a tray 20 is received within the container 10, each tray connector 24 of the tray 20 is aligned and forms a connection with a respective tray receiver 26 of the container 10. In some embodiments, the connection between the tray connectors 24 and the tray receivers 26 allow for transmission of power from the container 10 to the tray 20 and may allow for the transmission of data or signals from the tray 20 to the container 10. In some embodiments, the container 10 and/or the trays 20 have a power bus for one- or two-way transmission of energy between the container 10, the trays 20, and the power supplies 100 and a separate data bus for one- or two-way transmission of data and/or signals between the container 10, the trays 20, and the power supplies 100. In some embodiments, the power and data buses are combined into a single bus.

In particular embodiments, the data bus, whether separate or combined with the power bus, may be used for pulling data off of the power supplies 100 and/or for writing data to the power supplies 100. For example, a bulk data update could be provided to multiple power supplies 100 within the container 10 (e.g., a firmware update could be provided to the power supplies 100 within the container 10).

In some embodiments, the container 10 may include pairs of tray rails 13 that are configured to slidably receive a tray 20. In some embodiments, each pair of tray rails 13 may be configured to form a tray receiver 26 to wirelessly connect with a tray connector 24 of a tray 20 received between the pair of tray rails 13. This configuration may allow for more than one tray 20 to be received between a pair of tray rails 13 while providing a connection between the container 10 and each of the trays 20. For example, one or more of the rails 13 may form a wireless connection (e.g., an inductive connection) with the tray 20 to allow for one-way or two-way transmission of energy, data, or signals between tray 20 and the container.

Referring to FIGS. 2-4, the container 10 of the depicted embodiment is configured to receive seven trays 20; however, in other embodiments the container 10 may be configured to receive any number of trays 20, e.g., between 1 and 100 trays 20. In some embodiments, the container 10 may be configured to receive more than 100 trays 20. The container 10 of some embodiments includes at least one second charging interface configured to electrically couple to at least one external power source (e.g., a power source external to the container 10). In some embodiments, such as the depicted embodiment, the second charging interface 12 is configured to electrically couple to the external power source via at least one physical connection. For example, in some embodiments, the external power source may be a wall socket (e.g., 110 v or 220 v at either 50 or 60 Hz), a battery, a capacitor, or the like. Additionally, or alternatively, the second charging interface may be configured to electrically couple to the external power source via at least one wireless connection. For example, when the container 10 is placed within range of an external power source, the external power source may wirelessly transmit energy to the second charging interface.

In some embodiments, the container 10 may include a container controller 18 that may control energy delivery to charging interfaces 40 and/or may control other electrical functions of the container. In some embodiments, each charging interface 40 and/or each tray 20 may include a charging controller 48. In some embodiments, the charging controller 48 may monitor the charging of one or more of the power supplies 100 of the tray 20. In some embodiments, the charging controller 48 may control power delivered to each charging interface 40. In some embodiments, the charging controller 48 may detect or monitor a charge level of each power supply 100. In some embodiments, the charging controller 48 may provide data or a signal to a controller of the container 10 (such as container controller 18) or an outside monitoring unit when a power supply 100 is out of compliance or defective. In some embodiments, when a power supply 100 is out of compliance or defective, the charging controller 48 may terminate power delivery to a charging interface associated with the power supply 100. Terminating power delivery may prevent additional damage to the power supply 100, the tray 20, the container 10, or a vehicle or building housing the container 10. In addition, providing data or a signal of the out of compliance or defective power supply 100 may allow for removal or the power supply 100 from the container 10. In some embodiments, the container controller 18 may receive the data or signals from the charging controllers 48 and may transmit data or signals to an outside controller. In certain embodiments, the container controller 18 may monitor the charging of power supplies 100 without interfacing with a charging controller 48 of the respective tray or trays 20 such that the one or more trays 20 can be provided without a charging controller 48. It should be noted that some embodiments need not include a container controller and/or need not include a charging controller.

In some embodiments, the tray may include a liner configured to reduce shock and/or vibration delivered to the plurality of power supplies during shipping. In some embodiments, the liner may be coated with and/or formed from a material that is fire retardant. In some embodiments, other surfaces of the container (e.g., any one or any combination of the surfaces of the container) may be coated with and/or formed from a material that is fire retardant. For example, walls of the container 10 may be coated or formed of a material that is at least one of shock, vibration, or fire retardant or suppressive.

In some embodiments, the shipping container may include at least indicator that is configured to provide a status indication (e.g., power supply type, charging status, amount of charge, defective, out of specification, charge capacity remaining, etc.) for one or more of the plurality of power supplies. In the depicted embodiment, the container controller 18 is in communication with an indicator 19 that provides visual (e.g., an indicator light or digital display) and/or audible alerts when one or more power supplies 100 within the container 10 are out of specification or defective. In some embodiments, the indicator 19 may provide an indication of which power supply 100 is out of specification or defective and/or which tray 20 includes the out of specification or defective power supply 100. In some embodiments, the indicator 19 may provide a visual charge status indicator for the container 10, such as a status indication for some or all of the power supplies. In some embodiments, the indicator 19 may provide a visual charge level for one or more of the power supplies. For example, in some embodiments the container 10 may include an indicator 19 (e.g., an indicator light) next to one or more trays to indicate the tray 20 includes an out of specification or defective power supply 100 and/or one or more charging interfaces 40 may include an indicator (e.g., an indicator light) to identify when a power supply 100 received within the charging interface 40 is out of specification or defective. In some embodiments, the indicators may illuminate a particular color, such as red, when a power supply 100 is defective or out of speciation. In some embodiments, the indicators may illuminate a different shade or different color, such as green, when the tray 20 or the charging interface 40 is energized and the power supplies 100 of the tray 20 or the interface 40 are within specification. In some embodiments, the indicators may illuminate a different shade or different color, e.g., orange or yellow, when the power supplies 100 of the tray 20 or the charging interface 40 are charging. In certain embodiments, the indicators may provide a visual charge status indicator for individual power supplies 100 on the charging interface 40 associated with the power supply (e.g., LED that can illuminate in various colors, a longitudinal light bar in which the length of the illuminated portion indicates charge level, etc.). In some embodiments, the indicator may be in the form of a panel that provides a status indicator for the charging interfaces 40 and/or the container 10.

In some embodiments, the container 10 may include a local power storage unit that is electrically coupled to the charging interfaces 40 to provide energy to the plurality of power supplies. In various embodiments, the local power storage unit 14 may, for example, comprise one or more batteries, one or more capacitors, or some combination thereof. In some embodiments the local power storage unit 14 may be recharged via the second charging interface 12 and be configured to supply the charging interfaces 40 with energy. In some embodiments that include a container controller 18, the local power storage unit 14 may be in communication with the container controller 18. For example, in some embodiments the container controller 18 may monitor an amount of energy stored in the local power storage unit 14 and/or a condition of the local power storage unit 14. In some embodiments, the container controller 18 may control charging and discharging of the local power storage unit 14 and/or delivery of energy from the local power storage unit 14 to the charging interfaces 40 (in some embodiments via the trays 20).

As noted, in some embodiments the second charging interface may be configured to electrically couple to an external power source via a wireless connection. For example, in some embodiments the second charging interface may comprise a receiver coil configured to inductively couple to a transmission coil, which may be external to the container 10. In such a manner, when the container 10 is placed within range of the transmission coil, power may be inductively conveyed to the receiver coil, and then subsequently delivered to the plurality of power supplies and/or to a local power storage unit, if included. For example, in some embodiments a transmission coil may be placed on a support surface on which the container 10 may be placed (e.g., on the floor of a warehouse, in a cargo hold of a vehicle, or on or in a pallet).

Figure 6:
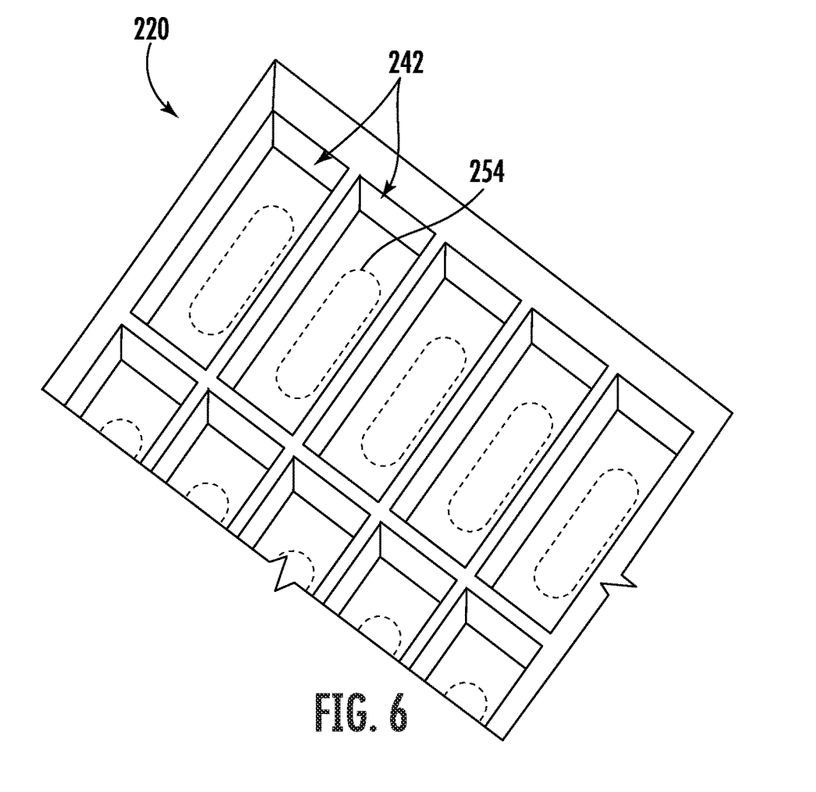
FIG. 6 is a view of a portion of another tray provided in accordance with other embodiments of the present disclosure.

Referring to FIG. 6, an example tray 220 that may be used in container 10 in combination with or in lieu of the tray 20 is illustrated. The tray 220 is similar to the tray 20 detailed above except where detailed below and may include various features or combinations of features described above with respect of tray 20. These various features or combinations are not detailed with respect to tray 220 for brevity.

In the depicted embodiment, the tray 220 includes a plurality of compartments 242. In some embodiments, the plurality of compartments may include a single charging interface or a plurality of respective charging interfaces associated therewith. In the depicted embodiment, the compartments 242 include a source wireless interface 254 and are configured to align the source wireless interface 254 with a supply wireless interface 154 of the power supply 100 (FIG. 1) such that a wireless connection is made therebetween.

Figure 7:
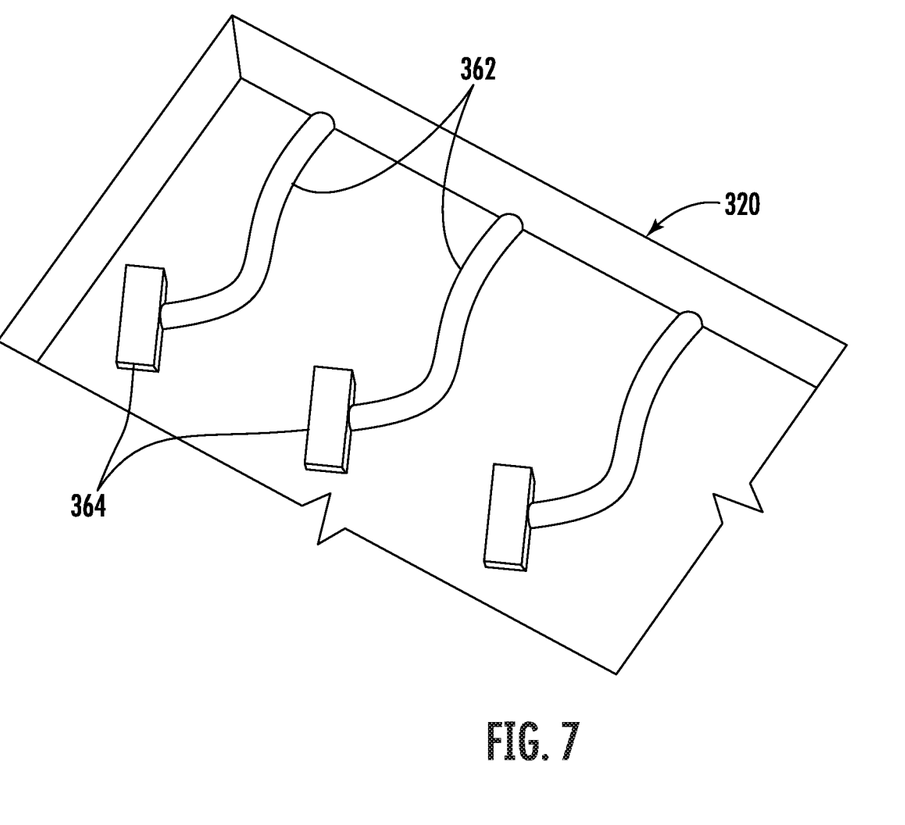
FIG. 7 is a view of a portion of another tray provided in accordance with other embodiments of the present disclosure.

Referring to FIG. 7, another example tray 320 is illustrated. The tray 320 may be used in container 10 in combination with or in lieu of the tray 20 and/or tray 220 in various embodiments. The tray 320 is similar to the tray 20 detailed above except where detailed below and may include various features or combinations of features described above with respect of tray 20. These various features or combinations are not detailed with respect to tray 320 for brevity.

In the depicted embodiment, the tray 320 includes one or more charging interfaces comprising a cord 362 having a connector 364 that is configured to interface with the connector 144 of the power supply 100 (FIG. 1) such that an electrical connection is made therebetween. In some embodiments, the connector 364 of the cord 362 may be a male (or female) connector (e.g., a USB connector) and the connector 144 of the power supply 100 may be the other of a female (or male) connector. In other embodiments, the connector 364 of the cord 362 and the connector 144 of the power supply may comprise a threaded connection. In other embodiments, other connections are possible, including for example, bayonet-type connections, pin connections, plug and socket connections, jack connections, magnetic connections, etc. In some embodiments, the connector 364 may comprise contact points that are configured to engage corresponding contact points on a power supply. The engagement between contact points may be accomplished through magnetic engagement and/or alignment between the contact points. In some embodiments, the power supply 100 may include a male connector and the cord 362 may include a female connector (or visa versa). For example, the cord 362 may include a sleeve that slides over a portion of the power supply 100 to form a connection with the power supply 100.

In some embodiments, when power supplies such as power supplies 100 are manufactured each power supply 100 may be charged to verify the power supply 100 is within specification. Once the power supplies 100 are verified, the power supplies 100 may be discharged to a safe level for shipment and are loaded for shipping. In some embodiments, when the power supplies 100 are received for packaging either alone or in a kit or assembly for final sale or delivery the power supplies 100 are charged to a sufficient level to enable an end user to use a device without pre-charging the power supply 100 (e.g., charging the power supply 100 before using the device or power supply. In some embodiments, the power supplies 100 are fully charged when received for packaging. In certain embodiments, the power supplies 100 are recharged after shipping and before delivery to an end user (e.g., prior to delivery to a retail location).

Some example methods of use of the container 10 to charge, test, and/or maintain the power supplies 100 are described below with reference to the container 10, trays 20, and power supplies of FIGS. 1-5. In some embodiments, at some point after the power supplies 100 are manufactured, the power supplies 100 may be positioned on the trays 20 with each power supply 100 received in a charging interface 40 of the tray 20. Once a tray 20 is partially filled or entirely filled, e.g., has a power supply 100 in each charging interface 40 of the tray 20, the tray 20 may be loaded into a container 10 such that a tray connector 24 of the tray 20 is in communication with a tray receiver 26 of the container 10. It will be appreciated that in embodiments where the tray 20 is permanently or semi-permanently installed within the container 10, the power supplies 100 may be positioned on the trays 20 with the trays 20 being installed within the container 10. In some embodiments, the trays 20 may be drawer-like and slide relative to the container 10 to improve access for loading the power supplies 100 into the trays 20.

In some embodiments, when the tray connector 24 is in communication with the tray receiver 26, energy may be provided to the tray 20 through the tray connector 24. In this regard, for example, the container 10 may provide energy to the tray 20 from a wall socket via the second charging interface 12 or may provide energy to the tray 20 from the local power storage unit 14. In particular, in some embodiments the local power storage unit 14 may receive energy from the wall socket via the second charging interface 12. Additionally, or alternatively, the power supplies 100 or the trays 20 within the container 10 may receive energy through a wireless charging power source external to the container 10 when the container 10 is within range of the external wireless charging power source. In some embodiments, the container controller 18 may detect when a tray 20 is loaded into the container 10 with the tray connector 24 in communication with the container 10 and initiate energy delivery to the tray 20.

In some embodiments, when the trays 20 are energized, the container controller 18 may poll each charging interface 40 to determine if a power supply 100 is connected to or received within the charging interface 40. The container controller may then initiate energy delivery to each power supply 100 and monitor one or more properties of the power supplies 100 during energy delivery. For example, in some embodiments the properties monitored by the container controller 18 may include, but are not limited to, one or more of a power supply type, a charging rate, a temperature, an amount of charge, or charge capacity remaining. In other embodiments, the container controller 18 may distribute power to each charging interface 40 independent of connection of a power supply 100 to the charging interface 40. In some embodiments, the power supplies may be configured to initiate communication with a container controller 18 to initiate energy delivery to through the respective charging interface 40.

In some embodiments, the container controller 18 may deliver energy to the power supplies 100 based on the properties of the power supplies 100. Some embodiments comprise at least one indicator configured to provide a status indication for one or more of the plurality of power supplies. In some embodiments, the indicator may comprise at least one indicator light, and/or at least one audible indicator, or combinations thereof. For example, in some embodiments one or more properties of a power supply 100 may be determined to be out of specification or defective based on preprogrammed or detected power supply type. In some embodiments, this may be determined by the container controller 18. In some embodiments, when the power supplies 100 are determined to be out of specification or defective, an indicator may be used. Additionally, or alternatively, data or a signal indicative of the defective power supply 100 may be generated and transmitted to an outside monitor. In some embodiments, the indicator may include an audible or visual indicator. For example, in some embodiments the container 10 may include an indicator 19 (e.g., an indicator light or digital display) next to one or more trays to indicate the tray 20 includes an out of specification or defective power supply 100 and/or one or more charging interfaces 40 may include an indicator 49 (e.g., an indicator light or digital display) to identify when a power supply 100 received within the charging interface 40 is out of specification or defective. In some embodiments, the indicators 19, 49 may illuminate a particular color, such as red, when a power supply 100 is defective or out of speciation. In some embodiments, the indicators 19, 49 may illuminate a different shade or different color, such as green, when the tray 20 or the charging interface 40 is energized and the power supplies 100 of the tray 20 or the interface 40 are within specification. In some embodiments, the indicators 19, 49 may illuminate a different shade or different color, e.g., orange or yellow, when the power supplies 100 of the tray 20 or the charging interface 40 are charging. In certain embodiments, the indicators 49 may provide a visual charge status indicator for individual power supplies 100 on the charging interface 40 associated with the power supply (e.g., LED that can illuminate in various colors, a longitudinal light bar in which the length of the illuminated portion indicates charge level, etc.). In some embodiments, the indicator 19 may be in the form of a panel that provides a status indicator for one or more of the charging interfaces 40 and/or the container 10.

In some embodiments, the container controller 18 or the charging controllers 48 may be in communication with an external device to provide status information of the power supplies 100 within the container 10. For example, the controllers 18, 48 may be in communication with a portable electronic device (e.g., a phone or a tablet) or a computer to provide status information of the power supplies 100 within the container 10. The communication between the controllers 18, 48 and the external device may be a wireless connection including, but not limited to, Wi-Fi, Bluetooth®, ZigBee, IR, or RF.

In some embodiments, when the power supplies 100 are loaded into the container 10 the charging controller(s) 48 may verify that the power supplies 100 are within specification and provide an indication when the power supplies 100 are fully charged. This can be used to verify that each power supply 100 is within specification before leaving a manufacturing facility.

In some instances, the power supplies 100 may be destined to be shipped to another facility for packaging and distribution for sale either as a power supply or as part of a larger item. Some forms of shipping, e.g., air shipping, have certain requirements for power supplies 100. For example, in some cases when shipping via air, some power supplies must be below a threshold charge level, such as 30 percent of a full charge. In some embodiments, the charging controller(s) 48 and/or the container controller 18 may include a charging/discharging cycle that that charges or discharges the power supplies of a tray 20 in a range suitable for shipping, e.g., in a range of 5 percent to 30 percent of a fully charge. In some embodiments, the charging controllers(s) 48 may fully charge a power supply 100 to verify the power supply is within specification and then discharge the power supply 100 to a range suitable for shipping. When the power supplies 100 meet specifications by taking a full charge and are then at a charge suitable for shipping, the indicator 19, 49 of some embodiments may provide an indication, e.g., illuminate green, to provide indication to a user that the tray 20 is prepared for shipping. In some embodiments, when a tray 20 is suitable for shipping, the tray 20 may be removed from the container 10 and shipped with the power supplies 100 within the charging interfaces 40 of the tray 20. In some embodiments, the entire container 10 may be shipped with trays 20 received within the container 10. In certain embodiments, the power supplies 100 may be removed from the tray 20 for shipping.

In some embodiments, after the power supplies 100 are shipped and received by a packing facility the power supplies 100 may be fully charged before being packaged. In some embodiments, a packing facility may be a facility that packages the power supplies 100 for final delivery or sale as a single unit or in a kit with another component. In some embodiments, when the power supplies 100 are shipped on trays 20 within a container 10 the container controller 18 may be programed to charge the power supplies 100 from the power storage unit 14 or the second charging interface 12 may be plugged into a power receptacle, e.g., a wall outlet. In embodiments where the power supplies 100 are shipped on trays 20 outside of a container 10, the trays 20 may be be loaded into a container 10 to fully charge the power supplies 100. In embodiments where the power supplies 100 are shipped separate from the trays 20, the power supplies 100 may be loaded into receptacles 40 of the trays 20 and the trays 20 be loaded into a container 10 to fully charge the power supplies 100.

In some embodiments, it may be advantageous to have the power supplies 100 shipped on trays 20 or in containers 10 to allow a packaging facility to manage inventory of power supplies 100 and to charge power supplies 100 before packaging. For example, in some embodiments the power supplies 100 may be bulk shipped and be warehoused for months at a time before being packaged for final delivery or sale. The packing facility may select a number of trays 20 or containers 10 of power supplies 100 each day or each shift to charge to ensure the power supplies 100 are fully charged for packing. When the power supplies 100 are shipped and stored on trays 20 or in containers 10, the packing facility may charge the power supplies 100 without individually handling each power supply 100. This may reduce labor at the packing facility. In addition, as the trays 20 or the containers 10 can be used at the manufacturer of the power supplies 100 and reused at the packing facility such that the power supplies 100 may be loaded into charging interfaces, e.g., charging interfaces 40, once and thus, reducing labor associated with testing, charging, discharging, and recharging the power supplies 100 during manufacture and packaging.

In some embodiments where the charging interfaces 40 are configured to wirelessly interface with the power supplies 100, the power supplies 100 may be part of a final product and fully packaged before being placed in a charging interface 40 of a tray 20. In such a manner, the tray 20 may be loaded into a container 10 to charge, discharge, or maintain a charge of the power supply 100 through the packaging without removing the final product from the tray 20. Some embodiments may include receptacles that may be used to charge, discharge, or maintain a charge of the power supplies 100.

As detailed above, power supplies may be fully charged before the power supplies are packaged for final sale to provide a fully or nearly fully charged power supply to an end user (e.g., after shipping form a manufacturer and before packaging and shipping for final sale) using the disclosed containers and/or methods. In addition, the containers and/or methods detailed herein may allow for monitoring of power supplies during shipping (e.g., during air shipping).

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A shipping container configured to charge a plurality of power supplies associated with a plurality of aerosol delivery devices, the container comprising:
   at least one tray, the tray containing the plurality of aerosol delivery devices having the associated plurality of power supplies, the tray comprising:
      a plurality of first charging interfaces, the plurality of first charging interfaces configured to provide energy to respective ones of the plurality of power supplies to charge the power supplies,
      wherein each of the at least one tray includes a plurality of compartments, the plurality of compartments configured to receive respective ones of the plurality of power supplies, and wherein respective ones of the plurality of first charging interfaces are associated with respective ones of the plurality of compartments.

2. The shipping container of claim 1, wherein the plurality of first charging interfaces are configured to wirelessly charge the plurality of power supplies.

3. The shipping container of claim 1, wherein the plurality of first charging interfaces are configured to charge the plurality of power supplies via one or more physical connections.

4. The shipping container of claim 1 further comprising at least one local power storage unit, wherein the plurality of first charging interfaces are configured to electrically couple to the at least one local power storage unit.

5. The shipping container of claim 1 further comprising at least one second charging interface, wherein the at least one second charging interface is configured to electrically couple to at least one external power source.

6. The shipping container of claim 5, wherein the at least one second charging interface is configured to electrically couple to the at least one external power source via at least one physical connection.

7. The shipping container of claim 5, wherein the at least one second charging interface is configured to electrically couple to the at least one external power source via a wireless connection.

8. The shipping container of claim 7, wherein the wireless connection comprises a receiver coil located on the container that is configured to wirelessly connect to a transmission coil of the at least one external power source.

9. The shipping container of claim 1 further comprising at least one indicator configured to provide a status indication for one or more of the plurality of power supplies.

10. The shipping container of claim 9, wherein the at least one indictor comprises one or more of an indicator light, a plurality of indicator lights, an audible indicator, a plurality of audible indicators, a digital display, or any combination thereof.

11. The shipping container of claim 1 further comprising a container controller configured to control power delivery to the plurality of power supplies.

12. The shipping container of claim 11, wherein the at least one tray includes a charging controller in communication with the container controller.

13. The shipping container of claim 1, wherein the shipping container is configured to be shipped with the plurality of power supplies electrically interfaced with plurality of first charging interfaces.

14. The shipping container of claim 1, wherein the at least one tray includes a liner configured to reduce shock and/or vibration delivered to the plurality of power supplies during shipping.

15. The shipping container of claim 1, wherein the at least one tray includes a liner that is coated and/or formed from a fire retardant material.

16. The shipping container of claim 1, wherein the container further comprises at least one tray receiver, wherein the at least one tray further comprises at least one tray connector, and wherein the at least one tray receiver of the container is configured to receive the at least one tray connector of the at least one tray.

17. The shipping container of claim 16, wherein the at least one tray receiver of the container and the at least one tray connector of the at least one tray are configured to create an electrical connection.

* * * * *